United States Patent
Heyne et al.

(10) Patent No.: US 9,617,368 B2
(45) Date of Patent: Apr. 11, 2017

(54) METHOD FOR POLYMERIZING MONOMER UNITS AND/OR OLIGOMER UNITS BY MEANS OF INFRARED LIGHT PULSES

(75) Inventors: Karsten Heyne, Großbeeren (DE); Anja Heyne, Großbeeren (DE)

(73) Assignee: FREIE UNIVERSITÄT BERLIN, Berlin (DE)

( * ) Notice: Subject to any disclaimer, the term of this patent is extended or adjusted under 35 U.S.C. 154(b) by 578 days.

(21) Appl. No.: 14/124,480

(22) PCT Filed: Jun. 6, 2012

(86) PCT No.: PCT/EP2012/060705
§ 371 (c)(1),
(2), (4) Date: Mar. 13, 2014

(87) PCT Pub. No.: WO2012/168302
PCT Pub. Date: Dec. 13, 2012

(65) Prior Publication Data
US 2014/0194549 A1    Jul. 10, 2014

(30) Foreign Application Priority Data
Jun. 7, 2011  (DE) .................. 10 2011 050 894

(51) Int. Cl.
| | |
|---|---|
| *C08F 2/46* | (2006.01) |
| *B01J 19/12* | (2006.01) |
| *C08G 18/00* | (2006.01) |
| *C08G 18/76* | (2006.01) |
| *C08G 18/08* | (2006.01) |
| *C08G 18/32* | (2006.01) |

(52) U.S. Cl.
CPC ............ *C08G 18/00* (2013.01); *B01J 19/121* (2013.01); *B01J 19/128* (2013.01); *C08F 2/46* (2013.01); *C08G 18/08* (2013.01); *C08G 18/3206* (2013.01); *C08G 18/7621* (2013.01)

(58) Field of Classification Search
CPC ....... C08F 2/46; C08G 18/00; C08G 18/7621; C08G 18/08; C08G 18/3206; B01J 19/121; B01J 19/128
See application file for complete search history.

(56) References Cited

U.S. PATENT DOCUMENTS

| | | | |
|---|---|---|---|
| 6,855,478 B2 | 2/2005 | DeVoe et al. | |
| 8,017,925 B2 | 9/2011 | Kress | |
| 8,481,232 B2 | 7/2013 | Watanabe et al. | |
| 2003/0099264 A1* | 5/2003 | Dantus ............... | G01N 21/6402 372/25 |
| 2008/0021126 A1 | 1/2008 | Dietliker et al. | |
| 2008/0255003 A1* | 10/2008 | Piletsky ................... | B41M 5/36 506/32 |
| 2010/0173100 A1* | 7/2010 | Weiss ...................... | B01J 3/006 427/582 |

FOREIGN PATENT DOCUMENTS

| | | |
|---|---|---|
| DE | 1944 002 A1 | 3/1970 |
| DE | 101 36 683 A1 | 2/2003 |
| DE | 10 2005 055 123 A1 | 5/2006 |
| DE | 601 14 820 T2 | 9/2006 |
| DE | 10 2008 055 719 A1 | 5/2010 |
| EP | 2 000 200 A1 | 12/2008 |
| WO | 2006/069448 A2 | 7/2006 |
| WO | 2007/082861 A1 | 7/2007 |
| WO | 2009/076267 A | 6/2009 |
| WO | 2009/135870 A1 | 11/2009 |

OTHER PUBLICATIONS

Germany Office Action dated Jan. 24, 2012 in application No. 10 2011 050 894.5.
Knoner et al., "Two-photon polymerization process for optically driven micromachines" International Society for Optical Engineering. Photonics: Design, Technology, and Packaging II, Brisbane, Australia, (603810-1-603810-9). Dec. 12, 2005.

* cited by examiner

*Primary Examiner* — Liam J Heincer
(74) *Attorney, Agent, or Firm* — Maschoff Brennan

(57) ABSTRACT

A method for polymerizing monomer units and/or oligomer units is disclosed. Said method is characterized in that the energy required for polymerization is introduced into the monomer units and/or oligomer units to be polymerized by means of infrared light pulses, wherein the infrared light pulses have a wavelength of 2500 to 20000 nm, an intensity of more than $10^{14}$ W/m$^2$, a duration of more than 8 fs and less than 3 ps and a substantially linear polarization.

15 Claims, 1 Drawing Sheet

METHOD FOR POLYMERIZING MONOMER UNITS AND/OR OLIGOMER UNITS BY MEANS OF INFRARED LIGHT PULSES

CROSS-REFERENCE TO A RELATED APPLICATION

This application is a national phase patent application of International patent application PCT/EP 2012/060705, filed on Jun. 6, 2012, which claims priority of German patent application 10 2011 050 894.5, filed on Jun. 7, 2011.

BACKGROUND

The invention relates in an aspect to a method for polymerizing monomer units and/or oligomer units.

From WO 2006/069448 A2 a method for removing material by means of infrared light laser pulses is known in which the energy of the infrared light is converted into heat energy of the material to be removed. Here, hot spots are produced within the material to be removed where the temperature lies above the vaporization point of at least one component of the material to be removed.

From WO 2007/082861 A1 a method for synthesizing product molecules is known in which energy is introduced by laser pulses of visible light into molecules of the starting material which are to react, wherein the reaction of the starting material molecules into product molecules takes place on a surface on which the molecules of the starting material are at least partly absorbed.

SUMMARY

The object underlying an aspect of the present invention is to provide a method in which a polymerization of monomer units and/or oligomer units into polymer units is substantially accomplished without a rise in temperature of the material to be polymerized. Furthermore, the object underlying an aspect of the invention is to specify a new possible use for infrared light pulses.

This object is achieved with the subsequently explained features.

The invention is, in an aspect, founded on the basic idea not to introduce heat into a system which is to react by means of infrared light pulses, but instead to deliberately excite bonds within the molecules which are to react, in order to, in this way, make possible the breaking up of these bonds and the re-linking of atoms previously participating in the bonds. Alternatively or additionally, radicals can also be produced in this way. In this manner, cross-linking reactions can be initiated, deliberately controlled and spatially arranged. The polymerizations to be carried out according to an aspect of the invention can here, for instance, also be polycondensation reactions or polyaddition reactions.

To achieve the object in a method for polymerizing monomer units and/or oligomer units into polymer units, the energy required for polymerization is provided by infrared light pulses. The infrared light pulses here have a wavelength of 2500 to 20000 nm, an intensity of more than $10^{14}$ W/m$^2$, a duration of more than 8 femtoseconds (fs) and less than 3 picoseconds (ps) and a substantially (that is to say predominantly) linear polarization. By means of such infrared light pulses it is ensured that substantially no heating of the molecules which are to react takes place, because the pulse durations of the infrared light pulses are too short for this. In this way, with infrared light pulses having a duration of less than 3 ps, particularly less than 1 ps and very particularly less than 500 fs, intramolecular and intermolecular energy redistributions, which can cause a thermal heating of the molecule, are avoided. On the other hand, a sufficiently high energy needs to be introduced into the molecules which are to react, which is why pulse durations of more than 8 fs, particularly more than 10 fs, particularly more than 50 fs and very particularly more than 100 fs are necessary.

To ensure that within these short time durations a sufficient energy intensity can be introduced into the molecules which are to react, it is required that the intensity of the infrared light pulses is greater than $10^{14}$ W/m$^2$, particularly greater than $10^{15}$ W/m$^2$, particularly greater than $10^{16}$ W/m$^2$ and very particularly greater than $10^{17}$ W/m$^2$. As such high intensities can currently only be produced by lasers, expediently an infrared light laser is employed as infrared light source.

The infrared light pulses furthermore have a predominantly linear polarization, the direction of which can be changed. As the infrared light absorption is determined by the vector direction of the vibration transition dipole moments (tdm), the infrared light will mainly be absorbed by those monomer units and oligomer units having a vibration transition dipole moment that is aligned parallel to the polarization direction of the infrared laser light. Thereby, the direction along which the polymerization takes place can be predetermined and altered by the infrared laser light polarization. Thereby, polymers having considerably different properties along various spatial directions can be produced, which cannot be achieved by heating, because that is a largely isotropic process. A possible application for this is to set the elasticity of a polymer very high along a first direction and very low along a second direction that is particularly running perpendicular to the first direction.

In order to attain an optimal excitation of the vibrations in the molecule, the infrared light pulses additionally best have a negative chirp. The technical term "chirp" is understood to be the property of a light pulse that its frequency changes over the duration of the light pulse. According to the model of the anharmonic oscillator, the higher the vibration levels, the smaller the distances between the various excited states of a vibration. That is to say, the energy needed to transfer a vibration from a high vibration level to an even higher level of vibration is lower than the energy required to transfer a vibration from the basic state to the first higher level of vibration. An infrared light pulse having a negative chirp takes this fact into account to the effect that the frequency declines over time, so that the energy provided by the infrared light pulse likewise declines over time. That is to say, the basic pulse of infrared light first has high-energy frequencies and in further course it has low-energy frequencies. Hence, the infrared light pulse is optimally adapted to the vibration levels to be excited so that an optimal energy transfer can take place.

Chirped infrared light pulses can, for instance, be produced with a deformable mirror or with the passive infrared light pulse shaper specified in the international patent application WO 2009/135870 A1

In a variant, infrared light pulses which are chirped linearly negative are used. That means that the frequency of said infrared light pulses declines linearly over the entire pulse duration; this especially approximates the model of the anharmonic oscillator and makes possible an especially suited energy input into the molecules which are to react.

At 2500 to 20000 nm (4000 cm$^{-1}$ to 500 cm$^{-1}$), the wavelength of the infrared light pulses is selected such that numerous vibrations of the bonds which shall be opened and re-linked for a polymerization reaction can be excited. In an embodiment, wavelength ranges extend from approx. 3000 nm to approx. 15000 nm, from approx. 4000 nm to approx. 10000 nm or from approx. 5000 nm to approx. 8000 nm.

In a variant of the method, the infrared light pulses additionally have a polarization. Thereby, it is possible to excite specific bonds, the vibration vectors of which are aligned along the polarization direction of the infrared light. While, particularly when working in liquid systems, due to diffusion there are indeed re-arrangements of the molecules which are to react, these effects recede into the background due to the very short duration of the infrared light pulses applied. Hence, by applying polarized infrared light pulses, it is possible to set a specific direction of polymerization within the polymer to be formed. In this manner, a deliberate cross-linking with a controlled cross-linking of the polymer to be produced can be attained.

In order to enable a good adjustment to the vibrations to be excited, in a variant each infrared light pulse sweeps over a spectral range of approx. 2 to approx. 1000 $cm^{-1}$. By making use of such a spectral range it is possible to also effectively excite vibrations which have a broad band in the absorption spectrum. Further suitable spectral ranges, which each infrared light pulse sweeps over during its life-span, are the ranges of about 100 to 900 $cm^{-1}$, particularly of approx. 200 to 800 $cm^{-1}$, particularly of approx. 300 to 700 $cm^{-1}$ and very particularly of approx. 400 to 600 $cm^{-1}$.

In order to get a sufficiently large number of monomer units and/or oligomer units to polymerize and to hence be able to produce a polymer that has a sufficiently large volume, the repetition rate of the infrared light pulses lies between 0.5 kHz and 200 MHz. In this manner, even within reasonable amounts of time bodies of polymer of a relatively large volume can be produced. Further suitable lower limits for the repetition rate are approximately 1 kHz, approximately 10 kHz, approximately 100 kHz and approximately 1 MHz. Further suitable upper limits for the repetition rate are approximately 10 MHz, 50 MHz, 80 MHz, 100 MHz, 150 MHz and 170 MHz.

In order to be able to cover, for instance, a larger spectral range simultaneously and in order to be able to break various bonds simultaneously in this manner, in a variant of the method multiple superposed infrared light pulses are used, which differ from each other in each case in at least one parameter. Said parameter can, for instance, be the spectral range and/or the polarization of the infrared light pulses. With the intensity of the individual infrared light pulses still being sufficient, the method of polymerization can in this manner be significantly accelerated, because the breaking up and the re-linking of individual chemical bonds can then not only be carried out serially, but also parallel.

Producing the multiple superposed infrared light pulses can in a variant take place, for instance, by means of at least one optical parametric amplifier. Such optical parametric amplifiers are suited to influence both the wavelength and the polarization of an infrared light pulse. Basically any optical parametric amplifier generally known to a person skilled in the art can be used. Common optical parametric amplifying crystals, from which the optical parametric amplifiers can be produced, are, for instance, lithium niobate and lithium tantalate, beta barium borate (BBO), silver thiogollate ($AgGaS_2$), potassium deuterium phosphate (KDP) and potassium titanyl arsenate (KTA).

The depth of penetration into the monomer units and/or oligomer units to be polymerized can be of basically any depth, however, it does depend on the properties of the monomer units and/or oligomer units as well as of the polymer units formed. If the polymer units absorb the infrared light of the used wavelength well, it is not possible to penetrate into deeper layers of monomer units and/or oligomer units, in so far as polymer units were already formed in a higher layer. However, when working with polymer units which do not absorb the infrared light of the wavelength used, it is possible also to penetrate into deeper layers of monomer units and/or oligomer units even after the polymerization of higher layers and to initiate polymerization reactions there.

In a variant, the method is carried out using suitable focusing lenses in order to additionally focus the beam of infrared light. Thereby, a higher spatial resolution of the polymerization reaction to be carried out can be attained. Additionally, taking into consideration the fact that individual photons do not contain sufficient energy to initiate the desired polymerization reaction, but instead that multi-photon processes are required for this purpose, one attains an additional higher spatial resolution, which depends on the required iterations, that is, the number of the required photons. For only when the necessary number of photons has successfully been brought onto one and the same bond, can this bond break and be available for a polymerization reaction.

In a variant the method is executed in such a way that the polymerization takes place in a localized space which is transversely smaller than 10 µm, particularly smaller than 5 µm, particularly smaller than 2 µm and very particularly smaller than 1 µm and longitudinally smaller than 20 µm, particularly smaller than 10 µm, particularly smaller than 50 µm, particularly smaller than 2 µm and particularly smaller than 1.5 µm. The terms "transverse" and "longitudinal" here refer to the propagation direction of the infrared light pulses.

Although the method can be carried out with substances in any state of matter, in a variant of the method the execution takes place in a liquid system. That is to say, the monomer units and/or polymer units which are to react are present as liquid substances and/or are dissolved in a liquid solvent. As a solvent, for instance, alcohols such as methanol, ethanol, propanol, butanol and corresponding diols such as, for instance, 1,2-ethanediol and 1,4-butanediol, or non-alcoholic, organic solvents such as, for example, carbon tetrachloride or aqueous solvents can be used.

In a variant of the method the solvent is selected, regarding both its chemical composition and the amount employed, to the effect that it can slow down exothermic or exergonic polymerization reactions or it can entirely prevent them from taking place spontaneously. This can, for instance, be accomplished by employing the same amount of solvent or even ten times as much solvent as monomer units and/or oligomer units which are to react. These indications of quantity here refer to volume percent relating to the solvent and to volume percent relating to the monomer units and/or oligomer units to be employed when these are present in the liquid state or to mass percent relating to the monomer units and/or oligomer units to be employed when these are present in the solid state. The larger the amount of the solvent employed, the lower the probability that two monomer units and/or oligomer units meet in order to be able to react with each other as part of a polymerization reaction. Furthermore, the heating of the solvent causes an energy drain from the monomer units and/or oligomer units so that their continued reaction can be prevented or at least be slowed down even if the process is basically exothermic.

In a variant of the method the monomer units and/or oligomer units which are to be polymerized are basic units of a plastic material. In this manner it is possible to produce a plastic material by polymerization by means of infrared light pulses, wherein the plastic material can alternatively have micro-structured areas. This can be adjusted by how the infrared light pulses are directed onto the monomer units and/or oligomer units to be polymerized in order to attain a localized or specified polymerization. Suitable plastic materials that can be produced are, for instance, polyurethane (PU), polyethylene terephthalate (PET), polyvinyl chloride (PVC) or polypropylene (PP). The corresponding basic units to be polymerized can hence be, for instance, isocyanate, terephthalic acid, ethylene glycol, vinyl chloride and propene.

In a variant of the method, it is executed in such a way that specific areas of the produced polymer have a higher degree of polymerization than other areas of the polymer. On the one hand, this can—as has just been addressed—be attained by deliberately directing the infrared light pulses onto specific areas of a solution or composition of the substances to be polymerized. For example, specific areas can longer be irradiated with infrared light pulses, so that a higher degree of polymerization sets in here. On the other hand, this variant of the method can also be accomplished—as explained above—by applying polarized infrared light pulses to be able to excite specifically determined bonds or bond directions to react, however, to exclude others from a reaction.

In a further variant of the method, the two variants previously mentioned are combined with each other such that a plastic material is produced which has at least an elastic and at least a plastic area. The elastic area here is an area having a lower degree of polymerization, while the plastic area is an area within the plastic material having a higher degree of polymerization. For example, a higher plasticity of specific areas can be attained by deliberately introducing cross-linkings, while other areas of the plastic material maintain their elastic properties. In this way, micro-structured plastic materials can be produced which have individually adapted properties and are hence adaptable to the specific requirements of the various possible applications.

Due to the micro-structuring, it is, for instance, possible to introduce inscriptions into a plastic material or into another polymer or into objects consisting of said plastic material or another polymer, respectively, without additionally having to apply an inscription onto the plastic material or the polymer here. Thereby, the durability of such letterings can be increased significantly and their life-span can be extended equally significantly. Also, micro-structured channels can be introduced into a polymer in order to be able to employ the polymer thereafter, for instance in micro-fluid technology.

In a variant of the method, the polymer has anisotropic properties which in a first direction of the polymer are 50% higher or lower in relation to the properties in a second direction. The second direction here deviates from the first direction particularly by at least or by about 10°, 30°, 45°, 60°, 75° or 90°.

The object is also achieved by the use of infrared light pulses as will be outlined in the following. According to this, the infrared light pulses have a wavelength of 2500 to 20000 nm, an intensity of more than $10^{15}$ W/m², a duration of more than 8 fs and less than 3 ps as well as a substantially linear polarization and are employed for polymerizing monomer units and/or oligomer units.

Embodiments or variants of the method according to an aspect of the invention are applicable in an analogous manner also regarding the use claimed according to an aspect of the invention.

The use of infrared light pulses for polymerization is suitable particularly for producing a micro-structured polymer. In this regard also, reference is made to the explanations above.

Further characteristics and details of aspects of the present invention will be further explained with the help of the figures and an example.

DETAILED DESCRIPTION

Figures 1, 2:
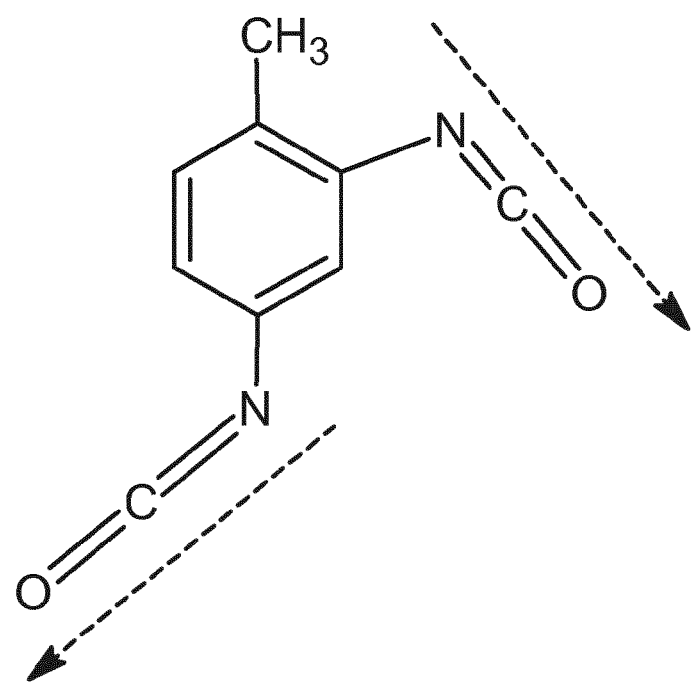
FIG. 1 shows the structural formula of toluene-2,4-diisocyanate.
FIG. 2 shows an example of a structured polymer.

FIGS. 1 and 2 will be further explained in connection with the subsequent example.

Example: Polymerization of Toluene-2,4-Diisocyanate (TDI)

100 µl TDI as the monomer unit to be polymerized are mixed with 1 ml anhydrous 1,4-butanediol as solvent and reaction partner, so that the result is a ratio of 10 to 1 (referring to the volume of the substances employed in each case) between the solvent and the monomer units to be polymerized. In this manner, it is attained that all the TDI molecules are actually able to react with the 1,4-butanediol, so that after completion of the polymerization reaction there is no TDI which has not reacted present anymore. As TDI is highly toxic, the presence of monomers in the polymer formed is undesirable.

In order to keep diffusion effects as low as possible in the prepared solution, only a part of the solution is applied onto an object slide and subsequently exposed to the infrared light pulses to initiate the polymerization reaction A laser with an intensity of $1.8 \times 10^{-15}$ W/m² is used. The output frequency of the laser is at 2280 cm$^{-1}$. Each laser pulse has a duration of 500 fs and sweeps over a spectral range of 100 cm$^{-1}$ (that is to say, it has a full width at half maximum of 100 cm$^{-1}$). The laser pulses applied are chirped negatively linear, so that their frequency decreases continuously from initially 2280 cm$^{-1}$ to 2180 cm$^{-1}$ during the pulse duration of 500 fs. Moreover, the light emitted by the infrared laser is linearly polarized. The repetition rate of the laser is 100 kHz, the focus is 20 µm.

The structural formula of TDI is illustrated in FIG. 1. The arrows next to the isocyanate groups of the TDI indicate the vibration transition dipole moment vectors of the two isocyanate groups. As these vibration transition dipole moment vectors are offset relative to each other by 90°, only one of the two isocyanate groups per molecule can deliberately be excited to react by applying polarized light.

A possible reaction scheme is the following: The excitation of the isocyanate groups with the infrared light pulses leads to a breaking up of the double bonds between the nitrogen atom and the carbon atom as well as between the carbon atom and the oxygen atom. The reaction with a hydroxyl group of the 1,4-butanediol then leads to a protonation of the nitrogen atom and to a formation of an additional carbon-oxygen-bond as well as to a re-formation of the double bond between the carbon atom and the oxygen atom. As a result, thus, a urethane group (—NH—CO—O—) forms. Due to the di-functionality of the TDI and of the 1,4-butanediol, linear polyurethanes can be formed in this way.

In order to form a cuboid made of polyurethane having a length of 100 µm, a width of approx. 1.5 µm and a depth of approx. 3 µm, 60 laser pulses with a simultaneous moving of the sample are required. Thus, by 3600 repetitions a cuboid having an edge length of 100 µm×100 µm×3 µm can be produced.

Apart from simple cuboid-shaped polymer structures, as specified previously, it is also possible to produce microstructured polymers and microstructures within a polymer, respectively. For example, in a modification of the example, the lettering "FU" can be represented as a polymer, as it is illustrated in FIG. 2.

The invention claimed is:

1. A method for polymerizing at least one of monomer units and oligomer units, wherein
energy required for polymerization is introduced into at least one of the monomer units and the oligomer units to be polymerized by means of infrared light pulses, wherein the infrared light pulses have
a wavelength of 2500 to 20000 nm,
an intensity of more than $10^{14}$ W/m$^2$,
a duration of more than 8 fs and less than 3 ps and
a substantially linear polarization.

2. The method according to claim 1, wherein the infrared light pulses additionally have a negative chirp.

3. The method according to claim 1, wherein each infrared light pulse sweeps over a spectral range of 2 to 1000 cm$^{-1}$.

4. The method according to claim 1, wherein the repetition rate of the infrared light pulses lies between 0.5 kHz and 200 MHz.

5. The method according to claim 1, wherein multiple superposed infrared light pulses are being used, which differ from each other in each case in at least one parameter.

6. The method according to claim 1, wherein the superposition of the infrared light pulses takes place by means of at least one optical parametric amplifier.

7. The method according to claim 1, wherein the polymerization takes place in a localized space which—referring to the propagation direction of the infrared light pulses—is transversely smaller than 10 µm and longitudinally smaller than 20 µm.

8. The method according to claim 1, wherein the polymerization takes place in a solvent.

9. The method according to claim 1, wherein a polymerization reaction, taking place spontaneously, with respect to energy, after the required activation energy is provided, is influenced by application of a solvent at a ratio of 1:1 (v/m) to 10:1 (v/m) to at least one of the monomer units and the oligomer units to be polymerized in such a way that the polymerization reaction is at the least slowed down.

10. The method according to claim 1, wherein at least one of the monomer units and the oligomer units to be polymerized are basic units of a plastic material.

11. The method according to claim 1, wherein the method is executed in such a way that specific areas of a produced polymer have a higher degree of polymerization than other areas of the polymer.

12. The method according to claim 10, wherein the method is executed in such a way that a plastic material is produced which has at least an elastic area and at least a plastic area.

13. The method according to claim 1, wherein a produced polymer has anisotropic properties which in a first direction of the polymer are 50% higher or lower than the properties in a second direction.

14. The method according to claim 1, wherein a microstructured polymer is produced.

15. The method according to claim 5, wherein the superposed infrared light pulses differ from each other regarding at least one of their spectral ranges and their polarization.

* * * * *